United States Patent [19]

Peel

[11] Patent Number: 4,746,449
[45] Date of Patent: May 24, 1988

[54] DEICING PRODUCT OBTAINED FROM PULP MILL BLACK LIQUOR

[75] Inventor: Terence E. Peel, Hudson Heights, Canada

[73] Assignee: Domtar Inc., Montreal, Canada

[21] Appl. No.: 102,006

[22] Filed: Sep. 28, 1987

Related U.S. Application Data

[62] Division of Ser. No. 799,865, Nov. 20, 1985.

[51] Int. Cl.$^4$ ............................................. C09K 3/18
[52] U.S. Cl. ........................................ 252/70; 162/16; 162/29
[58] Field of Search ................... 252/70; 162/16, 29

[56] References Cited

U.S. PATENT DOCUMENTS 4,430,240  2/1984  Sandvig et al. .................... 252/70
4,664,832  5/1987  Sandvig et al. .................... 252/70
4,668,416  5/1987  Neal ................................... 252/70

Primary Examiner—David L. Lacey
Assistant Examiner—K. M. Hastings

[57] ABSTRACT

A deicing product comprising a mixture having, based upon the total weight of solid in said deicing product between 12% and 75% acetate salts, trace amounts and 36% carbonate salts, 1 and 24% formate salts, 1 and 32% pseudolactate salts. The cations of said salts are selected from the class consisting of sodium, magnesium, calcium, potassium. Lignin fractions and low molecular weight sugars may also be present, as well as other chemicals derived from the method of making black liquor and this new product. A method of making same is disclosed. It comprises using a black liquor obtained from a pulp mill operation, fractionating said black liquor into a low molecular weight fraction, concentrating said collected low molecular weight fraction to produce a concentrated deicing product.

5 Claims, 1 Drawing Sheet

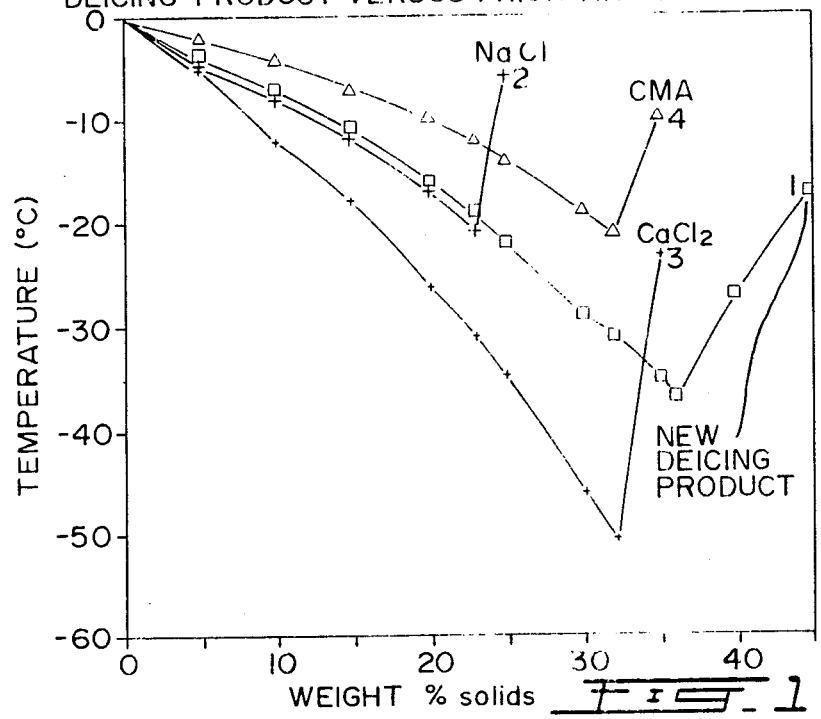
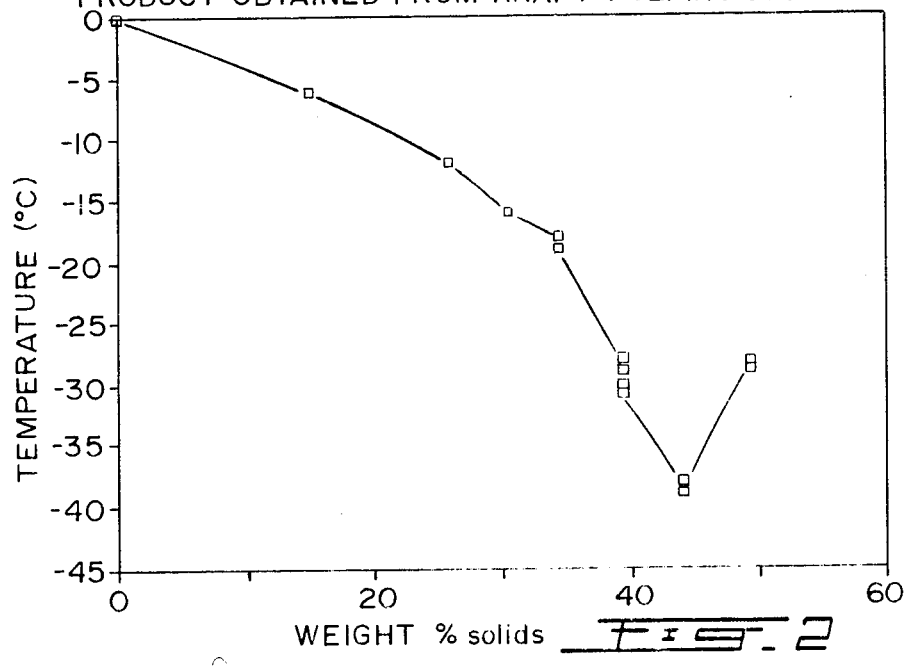

DEICING PRODUCT OBTAINED FROM PULP MILL BLACK LIQUOR

This application is a division of application Ser. No. 799,865, filed Nov. 20, 1985.

This invention is directed to deicing products and to a method of converting black liquor of pulp mills into deicing products.

BACKGROUND OF THE INVENTION

Present existing deicing products that are commonly used are: salt (sodium chloride), calcium chloride and urea, the latter two being more expensive than salt. Chloride salts suffer some drawbacks inter-alia, they accelerate corrosion resulting in damage to cars, trucks, and other vehicles; some are hazardous to the environment or expensive.

The use of about 11M tons of highway salt in North America accelerates motor vehicle corrosion rates to about twice that which would be expected if no salt was used according to articles entitled:

J. C. McBride, W. J. Kennedy, J. H. Thuet, M. C. Belangie and R. M. Stewart, "Economic Impact of Highway Snow and Ice Control (final report)", Utah Dept. of Transportation, Salt Lake City Research and Development Unit, Report No. UDOT-MR-77-5; FHWA/RD-77-95: December 1977.

R. L. Chance, "Corrosion, Deicing Salts, and the Environment", Materials Performance, p. 16, October 1974.

H. J. Fromm, "The Corrosion of Auto-Body Steel and the Effects of Inhibited Deicing Salts", Department of Highways, Ontario, Report No. RR135,(1967).

"Deicing Salts, Their Uses and Effects", NACE Group Committee T-3, Report 3W175, Materials Performance 14 No. 4, 9 (1975).

This has caused automobile manufacturers to improve design, materials of construction and coating systems. Owner care and maintenance is also a critical factor in extending vehicle life.

The relatively rapid deterioration of concrete is in part a result of rebar (reinforcing steel) rusting accelerated by saline solutions in the concrete structure and their accumulation in pore water. Annual maintenace costs of reinforced concrete highways are certainly in the range of hundreds of millions, if not billions of dollars. In the last few years there has been increased research into alternative deicing chemicals, especially in the United States, with the objective of reducing the use of NaCl as road deicer in favour of materials that would be less harmful to vehicles, roads, plant and animial life, soils, etc. as NaCl is reported to be. The material being most extensively researched for use on highways to this point is calcium-magnesium acetate (CMA). While CMA may have the necessary properties of a deicer (i.e. among others it reduces the freezing temperature of water, and thus has ice-melting capabilities), its production cost is prohibitive when commercially available acetic acid is used in its manufacture. Research is in progress to reduce the manufacturing cost, however, a satisfactory process has not yet been demonstrated.

THE INVENTION

Broadly stated, the present invention aims at converting black liquors, which are waste products, into valuable new deicing products which may effectively compete with other deicing agents which may be available. In a preferred embodiment the invention is directed to those new deicing products offering the advantages of being less susceptible to corrode vehicles and reinforced concretes.

The deicing product is obtained by:

(a) using a black liquor obtained from a pulping operation, (b) fractionating said black liquor into a low molecular weight fraction, (c) concentrating said collected low molecular weight fraction to produce a concentrated deicing product.

Black liquor is the term used for the waste effluent that results from pulping operations. It consists mainly of water, the spent pulping chemical and an organic fraction that is itself water soluble, composed of lignin and lignin-degradation products, high molecular weight carbohydrate-related compounds, sugars and low molecular weight organic acids and their anions.

The deicing fraction obtained from black liquor comprises a mixture of members selected from the class consisting of sodium acetate, sodium carbonate, sodium formate, sodium lactate, sodium bicarbonate and salts of magnesium, calcium, potassium of members selected from the ions acetate, formate, lactate, bisulfite and sulfate, lignin fractions and low molecular weight sugars.

Preferably the invention is directed to black liquors obtained from alkali pulping mills. Although other pulping processes may be used, such as those obtained from kraft mills but in this latter process, it is preferable to introduce a purification step for sulfur removal, such as oxidation, precipitation, removal of strong acid anions such as $SO_4$ if it is present, for instance by precipitation with $BaCl_2$. This invention may also be used, if desired, with magnesia pulping processes, and other pulping processes making use of calcium and potassium.

Broadly stated the new deicing product comprises a mixture having, based upon the total weight of solid in said deicing product between 12% and 75% acetate salts, trace amounts and 36% carbonate salts, 1 and 24% formate salts, 1 and 32% pseudolactate salts, and wherein the cations of said salts is a member selected from the class consisting of sodium, magnesium, calcium, potassium.

By pseudolacate is meant the amount of lactate which apparently is present in the deicing product, as determined upon analysis, from atomic absorption spectroscopy and ion chromatography methods. For sake of brevity, it is further identified as "lactate" to mean pseudolactate.

If $Na_2CO_3$ is used, the deicing product comprises mainly a mixture of members selected from the class consisting of sodium acetate, sodium carbonate, sodium formate, sodium lactate, sodium bicarbonate with the low molecular weight lignin fractions and low molecular weight sugars. When kraft is used, a mixture of at least some of the following members will also be present, sodium sulfate, sodium thiosulfate, sulfonated low molecular weight lignin fractions thiols and sulfides.

When the pulping process involves calcium, potassium or magnesia, these cations will be found associated with anions selected from the class consisting of bisulfites, sulfate, acetate, formate, lactate and other acids such as those referred to above.

The deicing product is concentrated for instance, by evaporation, generally to at least 20% total solid concentration, depending upon the intended use. In some applications, the water is substantially removed, such as by drum drying, in order to obtain a solid product preferrably consisting of large particles. Large particles, or crystals depending upon the nature of the deicing product, move down through an ice surface, melting it, until they reach the asphalt or other similar interface where the particles cause further melting at the interface, thereby enabling easy removal of the ice. Also, the deicing product may contain grits such as sand and other additives, again according to the intended use. The word "concentrating" implys all action to increase the low molecular weight fraction such as by evaporation, drying or breaking down high molecular weight fraction, to a concentration suitable for the end use of the deicing product, as will be further discussed hereinbelow.

Fractionating of the black liquor into low molecular weight fractions means the conversion of the black liquor into a product which no longer contains a high molecular fraction. This is obtained by physical means such as filtering (membrane filtration), centrifuging and the like, as well as by chemical means to convert the high molecular weight fraction, by oxidation for instance, into low molecular weight acid products and low molecular weight lignin fractions, including salts of oxy and hydroxyacids, as will be discussed further hereinbelow.

In a particular embodiment the deicing product is substantially free of corrosion accelerating anions and comprises a mixture of members selected from the class consisting of sodium acetate, sodium carbonate, sodium formate, sodium lactate, low molecular weight lignin fractions and low molecular weight sugars and may contain similar oxyacid anions.

Preferably, when low molecular weight lignin fractions and sugars are present, these are present in an amount ranging between 1 and 25%, based upon the total weight of the solid present in the deicing product.

In another particular embodiment, the deicing product is a mixture comprising at least 90% by weight of salts of organic acids, said organic acids including members selected from sodium acetate, sodium carbonate, sodium formate, sodium lactate and less than 0.5% sodium chloride, based upon the total weight of the solid present in the deicing product.

This product is particularly useful for deicing roads. The expression "road" or "roads" throughout the disclosure and claims is meant to include highways, parking facilities, airport runways, driveways, sidewalks, bridge decks, and garages, as well as other pavement surfaces, whether residential, commercial or industrial. It may also be used in other deicing applications such as in aggregate or grit storage piles to prevent freezing.

Such a product generally contains a very small amount of what may be referred to as corrosion accelerating anions such as chlorides, sulfates, nitrates and has not shown major impact upon the environment so far.

BRIEF DESCRIPTION OF THE DRAWINGS

In the drawings, a particular embodiment illustrating the deicing characteristics of the new deicing product in which, FIG. 1 illustrates the freezing point depression curves of one of the deicing products obtained from black liquor wherein $Na_2CO_3$ is used as pulping chemical, as compared against NaCl, $CaCl_2$ and Calcium Magnesium Acetate.

FIG. 2 illustrates the same but from a black liquor of a kraft pulping process.

CHEMICAL—MEANS E.G. PARTIAL OXYDATION

Among the preferred ways of carrying out the invention, the fractionation of the black liquor is obtained by partial oxidation of the black liquor to break down the high molecular weight fraction of the black liquor into low molecular weight fractions.

One of the specific methods of obtaining this partial oxidation is by continuously feeding oxygen and black liquor to a pressurized reaction vessel which may be provided with a mixing means. This method is sometimes referred to as wet air or solution oxidation. Applicant uses however, a controlled wet air oxidation in order to convert the high molecular components or fraction of the black liquor into a low molecular weight fraction and to increase or produce solely a low molecular fraction.

In order to accomplish this reaction, a pressurized vessel is maintained above the boiling point of water and is under pressure. The oxidation must be such that long chains or large complex molecules will be fractionated into short chains or simpler species. This is accomplished by regulating the variables of reaction time, temperature, pressure, mixing and the reactants concentrations including the nature of the oxidation source, as higher concentration, longer exposure, greater mixing, higher pressure and temperature, all enhance the oxidation process and may also result in attack of the short chains and smaller molecules.

In general, because of the low solubility of oxygen in black liquor the controlled oxidation reaction is easily obtained. To start the oxidation the reactants are first heated to a temperature above the boiling point of water, once the first reactants are present in the pressurized reaction vessel, the reaction is exothermic and can be maintained by the controlled addition of further black liquor and oxygen. The gas that is released is removed generally near the upper portion of the reactor. This gas contains $CO_2$ and also water and other gaseous reaction products. The oxygen is bubbled into the black liquor, preferably near the bottom of the reaction vessel, while the more concentrate black liquor which is fractionated into low molecular weight fraction is collected at the upper portion of the liquid layer. Obviously said pressurized reaction vessels are provided with suitable pressure reducing valves necessary for collecting the reaction products at ambient pressure.

With this method, it has been found that the product that may be obtained is substantially free of corrosion accelerating anions and contains oxy and hydroxy acid anions, furthermore, as water is evolved throughout the reaction, evaporation of the water occurs and both step (b) and (c) of the reaction are carried out simultaneously, or at least a portion of these steps, according to the reaction conditions.

Another way of oxidizing the black liquor is by batches, in a pressurized vessel where oxygen and the black liquor are introduced, the vessel heated, the reaction carried out for a period of time, stopped and the black liquor now in a state of lower average molecular weight can then be concentrated. Instead of oxygen, air may conveniently be used if desired, as well as other oxidation sources able to oxidize the higher molecular weight components.

PHYSICAL MEANS: MEMBRANE FILTRATION, ETC.

In another embodiment in accordance with the present invention, membrane filtration, in particular ultrafiltration is used to essentially separate the substances in the liquor into high and low molecular weight fractions followed by an evaporation stage to concentrate the low molecular fraction.

The major differences between membrane filtration and conventional filtration are the size of the particles to be separated and the specific interaction between the mixture components and membrane matrix. Specifically, membrane separation is in the molecular range. Depending on the pore size of the membrane, the applied static pressure, and the difference between the osmotic pressure of the starting solution and that of the filtrate, the membrane process may be referred to as utrafiltration (UF) or as opposed to hyperfiltration (HF). For the former, a pore size in the order of 0.01 microns and an applied static pressure of up to 200 psi may generally be used. The corresponding numbers for the later process are of the order of 0.002 microns and 900 psi. The UF membranes fractionally separate substances with molecular weights (MW) in the range 500–30,000.

Ultrafiltration involves forcing a solution under pressure over a semi-permeable membrane through which some of the solution will pass in a type of reverse osmosis process. In addition to water, a small amount of inorganic salts and organic acids may permeate through the UF membranes depending upon their molecular size. The composition of the permeate (that is the solution passing through the membrane) being controlled via pressure and the nature of membrane.

In a preferred embodiment when ultrafiltration is used, the black liquor is first passed through a relatively coarse screen, let us say of the order of 250 mesh screen, in order to remove larger suspended particles.

When concentrating or drying according to step (c) the pH should preferably be closely monitored when the corrosion factor is important, as it may very depending upon the nature of the black liquor. This, for instance, is by acidification or alkalination, as the case may be, so that the pH brings the deicing product close to neutrality, let us say around 6.5 to 9.0 or 10.0. For instance, during drying of $Na_2CO_3$ pulping process derived products, probably due to the conversion of biocarbonate to carbonate, and possibly $CO_2$ evolution, the pH may vary, and its control may be desired. If one desires, other physical means could also be used in order to fractionate the black liquor and to obtain the low molecular weight fraction, such as by ultra-centrifugation.

In a particular embodiment, the black liquor concentration to be filtered is 10–30% concentration and the premeate is 30–80% of the amount by volume of the black liquor being fed to the membrane filtration unit.

The following will serve to illustrate some of the numerous ways of carrying out the invention.

EXAMPLE 1

This illustrates one of the chemical ways of fractionating black liquor, by controlled partial oxidation using a vented reaction.

Two liters of black liquor was charged into a pressurized reaction vessel of 4.5 liter. The black liquor was obtained from a chemimechanical pulping operation where $Na_2CO_3$ was the pulping chemical. The vessel was also provided with means of bubbling oxygen through the black liquor, means of venting out the gas present under pressure in the vessel, and a stirring motor with a propellor having a 5–7 cm blade.

The following set of conditions were used as shown in Table 1.

TABLE 1

| | |
|---|---|
| Temperature: | 210–220° C. |
| Pressure-total: | 450–550 PSI |
| Amount of oxygen were passed through the reaction vessel: | 400 grams |
| Vent rate: 2–4 liter/minute of $CO_2$, $H_2O$, oxygen, etc | |
| Agitation rate of propeller blade: | 900 RPM |
| Amount of liquor charge: 2 liter of 12% solids concentration, not diluted or filtered | |
| Amount of liquor collected after 3 hours reaction time: | 1.3 liter |
| pH variations during reaction: 6.5–9.7 | pH range |
| Amount of oxygen consumed: | 84 grams |
| Amount of oxygen necessary to totally oxidize the black liquor: | 140 grams (calculated) |

EXAMPLE 2

A pressurized vessel was used to carry out this fractionation, but without oxygen inlet or gas outlet, the oxygen having been all introduced at the beginning of the reaction with the black liquor. The black liquor was of the same source as defined under Example 1, but diluted from 5 to 16.6 times and used to carry out several experiments. The conditions that were used are set under Table 2.

TABLE 2

| | |
|---|---|
| Temperature range | 140–230° |
| Oxygen partial pressure | 80–200 PSI |
| Total pressure | 200–680 PSI |
| Liquor dilution factor | *5–16.67 times |
| Liquor volume | 1000 ml |
| Head space volume | 1000 ml |

*In some cases the liquor - was filtered prior to use; contained additional added caustic

RESULTS OF EXAMPLES 1 AND 2

The end products were a very complex mixture of various organic acids and their salts, and other lignin derivable molecules. During said oxidation, the low molecular weight sugars were found to have been oxidized, as well as the high molecular weight components. Included in this mixture were the following which form part of the deicing product.
1. Salts of carbonate e.g. sodium carbonate—$Na_2CO_3$
2. Organic acids and their respective salts, including but not limited to:

| | |
|---|---|
| $CH_3COOH$ | acetates |
| $HCOOH$ | formates |
| $HOC(CH_2CO_2H)_2CO_2H$ | citrates |
| $CH_3CHOHCOOH$ | lactates |
| $HO_2CCHCHCO_2H$ | fumarates |
| $HOCH_2CO_2H$ | glycolates |
| $CH_3CH_2CO_2H$ | propionates |

Obviously, some of the factors, temperature, pressure, time, or amount of reactants could be allowed to increase while others allowed to decrease and a similar product would be obtained. For instance, temperatures of 120°-300° C. could be used. Also, higher pressure could be used, although lower pressures are generally preferred depending upon all conditions including the nature of reactants.

The following two examples exemplify mechanical means of obtaining a deicing product.

EXAMPLES 3 and 4

The black liquor used was obtained from a chemimechanical pulping operation using $Na_2CO_3$ as the pulping chemical where the total solids content was about 13% by weight (wt %). An analysis of its composition, representative of this waste product stream, yields the following:

TABLE 3

|  | As is sample (% wt/v) | Dried Solids sample (% wt/wt) |
|---|---|---|
| Weak Acids | 4.40 | 33.85 |
| Acetate ($CH_3COO^-$) | 3.0 | |
| Lactate ($CH_3CHOHCOO^-$) | 0.5 | |
| Formate ($HCOO^-$) | 0.7 | |
| Oxalate ($C_2O_4^=$) | 0.2 | |
| Sugars | 0.81 | 6.23 |
| Rhamnose ($C_6H_{12}O_5$) | 0.01 | |
| Arabinose ($C_5H_{10}O_5$) | 0.09 | |
| Xylose ($C_5H_{10}O_5$) | 0.58 | |
| Glucose ($C_6H_{12}O_6$) | 0.09 | |
| Galactose ($C_6H_{12}O_6$) | 0.04 | |
| HW lignin (absorbance at 280 nm) | 3.80 | 29.23 |
| Inorganics | | |
| Na | 2.55 | |
| Carbonate & bicarbonate | 1.10 | |
| Subtotal | 12.66 | 97.88 |
| Total dissolved solid | 13.00 | 100.00 |
| Total organic carbon | 5.29 | 68.77 |
| Inorganic carbon | 0.42 | 3.23 |
| Ash | | 42.20 |

The black liquor which had been initially screened (−250 mesh) was passed through a membrane filtration module equipped with DDAS-HS65PP membranes having molecular weight cut off value: 500, under an operating pressure of 3.0 megaPascal (MPa). The separation was discontinued as soon as half of the original liquor volume had passed through the membranes, i.e. appeared as permeate. The separation was done on two occasions using two different black liquor samples and with all mentioned variables being kept constant. Table 4 gives relevant information about the experiments.

TABLE 4

DATA FOR HYPERFILTRATION SEPARATIONS

| Example | Permeate Initial | Flow Final | Total Solids Content of Permeate | pH of Permeate |
|---|---|---|---|---|
| 3 | 190 | 170 | 6.7 wt. % | 8.6 |
| 4 | 224 | 182 | 5.1 wt. % | 7.3 |

The permeates from Examples 3 and 4 were dried, and the composition of Example 3 was determined by ion chromatography and atomic absorption spectroscopy, results are shown in Table 5.

TABLE 5

| | |
|---|---|
| 50 wt % Na-acetate | 0.4 wt % NaCl |
| 10 wt % Na-lactate | 0.2 wt % $Na_2SO_4$ |
| 14 wt % Na-formate | 0.1 wt % $Na_2S$ |
| 19 wt % $Na_2CO_3$ | About 2 wt % K/Ca salts |
| | rest organic (mostly lignin) |

No analysis was done of Example 4, but the lower pH indicated a lower carbonate content. Obviously, other conditions could be used to effect a similar separation by means of alternative membranes, pressures, or temperatures, and according to the nature and concentration of the black liquor, etc.

The analysis illustrate that the material consists of about 96% of sodium, potassium and calcium salts of inorganic and low molecular weight organic acids. The material as a whole is not very environmentally damaging.

A number of tests were performed to study the suitability of Examples 3 and 4 as an alternative deicing chemical. These were related to freezing point depression, ice-melting characteristics and corrosion enhancement.

FREEZING POINT DEPRESSION

FIG. 1 and Table 6 show the freezing point depression curves of an aqueous solution of low molecular weight fraction of the low molecular weight black liquor (LMWBL) Example (3), NaCl, $CaCl_2$ and CMA. LMWBL of Example 4 yielded freezing points of −20° C. at 30 wt % and −15° C. at 20 wt %, essentially the same as for Example 3. The freezing point depression of material from Example 1 was also found to be similar to that of Example 3, however, the eutectic temperature was somewhat higher at about −30° C. The results for LMWBL were obtained by preparing the appropriate solutions and then placing the test tube into a methanol/sluth bath capable of cooling the solution to below its eutectic temperature. Freezing point depression measurements were made using a thermometer or thermocouple while constantly stirring the deicing compound solution.

As can be seen, LMWBL has a very respectable eutectic at −37° C. and 36 wt % in $H_2O$, which compares favourably with NaCl (−21° C. at 23 wt %) and CMA (−21° C. at 32 wt %). Only $CaCl_2$ has a much lower eutectic temperature (−51° C. at 32 wt %), but nevertheless LMWBL is still suitable for extremely cold weather from this point of view.

TABLE 6

FREEZING POINT DEPRESSION CURVES

| Weight % | Example 3 | NaCl | $CaCl_2$ | CMA |
|---|---|---|---|---|
| 0 | 0 | 0 | 0 | 0 |
| 5 | −4 | −5 | −5 | −2 |
| 10 | −7 | −8 | −12 | −4 |
| 15 | −11 | −12 | −18 | −7 |
| 20 | −16 | −17 | −26 | −10 |
| 23 | −19 | −21 | −31 | −12 |
| 25 | −22 | −6 | −35 | −14 |
| 30 | −29 | | −46 | −19 |
| 32 | −31 | | −51 | −21 |
| 35 | −35 | | −23 | −10 |
| 40 | −27 | | | |
| 45 | −17 | | | |

ICE-MELTING CHARACTERISTICS

To determine the actual ice-melting properties of LMWBL, a thin layer of ice from de-ionised water at −10° C., and about 3-4 mm thick was prepared and samples of rocksalt, CMA and Example 3 were sprinkled on it. The same amount was used for each sample, about 0.5 $g/cm^2$; all samples has approximately the same average particle size (1.5-2 mm diameter)—with CMA being most and Example 3 being least homogeneous in this respect. After 15 minutes, the rocksalt sample had completely melted through the ice surface while CMA and Example 3 had penetrated it about halfway. After 30 minutes, rocksalt had melted all the ice, Example 3 had fully penetrated the ice layer and CMA was very close to full penetration. After 45 minutes, all samples had essentially melted all the ice in their surroundings.

From this test it is apparent that LMWBL performs better than CMA in terms of actual ice-melting and ice-penetrating properties. It may therefore be said that the LMWTBL product is a good deicer. In a further example of this invention, a sample of black liquor as obtained from the kraft pulping process was fractionated using a membrane filtration procedure similar to that of Example 3. The composition of the low molecular weight permeate was found to be somewhat similar to that found in the other Examples, but in addition notable quantities of sodium sulfate and sodium thiosulfate were found. This is not surprising considering that the kraft pulping process makes use of sulfur containing chemicals. FIG. 2 shows that results of freezing point depression experiments using this material.

CORROSION TESTS

On corrosion tests conducted, LMWBL was much more benign than rocksalt and from the standpoint of metal corrosian LMWBL is a suitable candidate as a deicing chemical.

All other ways to remove the high molecular weight fraction of black liquor are also contemplated whereby high molecular components are excluded either by removal or by being broken down into low molecular weight components.

Thus, as can be easily seen LMWBL is a suitable candidate for a deicing chemical. It exhibits superior performance to NaCl regarding corrosion and freezing point depression and it performs better than CMA with respect to freezing point depression. Actual field trials comparing the ice melting properties of NaCl, LMWBL as per Example 3, CMA, and a urea containing deicer further demonstrated that the LMWBL deicer was superior in performance to the other alternative deicing products, and in addition nearly equaled the behaviour of NaCl.

THE NATURE OF THE PRODUCT

EXAMPLE 5

A deicing product as prepared from a carbonate pulping process black liquor using a membrane filtration process with subsequent concentration of the low molecular weight permeate fraction was analysed. The apparent composition (as determined from atomic absorption spectroscopy and ion chromatography analysis methods) was as follows:

| 52% sodium acetate | 0.4% sodium chloride |
|---|---|
| 19% sodium carbonate | 0.2% sodium sulfate |
| 15% sodium formate | 0.1% sodium sulfide |
| 8.6% sodium "lactate" | 2% potassium and calcium salts | and calculated by difference 2.7% lignin fractions or low molecular weight sugars. This formulation was found to have a eutectic temperature of $-37°$ C. at 36 wt/wt % solids.

EXAMPLE 6

The same was repeated with another product wherein the composition was:

| 62.6% sodium acetate | 1.4% sodium oxalate |
|---|---|
| 9.0% sodium carbonate | 0.1% sodium sulfate |
| 18.7% sodium formate | 0.7% sodium chloride |
| 6.6% sodium "lactate" | | and calculated by difference 0.9% of other cations, salts, lignin fractions or low molecular weight sugars. This formulation was found to have a eutectic temperature of $-28°$ C. at 37 wt/wt % solids.

EXAMPLE 7

The same was repeated with a product having been prepared from a kraft pulping process black liquor and the composition obtained was as follows:

| 16.5% sodium acetate | 0.9% sodium oxalate |
|---|---|
| 17.7% sodium carbonate | 12.3% sodium thiosulate |
| 13.2% sodium formate | 1.2% of other sodium sults and by difference 13.9% of other cations, salts, lignin fractions, or low molecular weight sugars |
| 12.3% sodium "lactate" | |
| 12.7% sodium sulfate | |
| 0.5% sodium chloride | |

This formulation was found to have an eutectic temperature of $-39°$ C. at 44 wt/wt % solids.

EXAMPLE 8

A deicing product as prepared from a carbonate pulping process black liquor using a partial oxidation process to transform the high molecular weight components into low molecular weight components, with subsequent concentration of the product and which has the apparent composition (as determined from atomic absorption spectroscopy and ion chromatography analysis methods) to be:

| 57.4% sodium acetate |
|---|
| 14.4% sodium carbonate |
| 6.3% sodium formate |
| 8.7% sodium "lactate" | and by difference 13.2% of other components. This formulation was found to have an eutectic temperature of $-30°$ C.

EXAMPLE 9

Another product was made by a process as disclosed in Example 8, the composition was as follows:

| 60.5% sodium acetate |
|---|
| 10.0% sodium carbonate |
| 11.2% sodium formate |
| 8.9% sodium "lactate" | and by difference 9.4% of other components. This formulation was found to qualitively perform as a deicing product.

EXAMPLE 10

A product made in accordance with Example 8 was made. However, high pressure liquid chromatography analysis methods were used, and showed that the mixture had the following composition:

| | | | |
|---|---|---|---|
| 47.6% | sodium acetate | 5.9% | sodium citrate |
| 14.4% | sodium carbonate | 0.7% | sodium glycolate |
| 2.6% | sodium formate | 0.3% | sodium fumarate |
| 1.0% | sodium lactate | 0.7% | fructose |
| 14.1% | sodium propionate | 2.2% | sodium oxalate | and by difference 10.5% of other components including low molecular weight lignin fractions and other cations. In each case the organic acid salts were analyzed as the free acids but their concentration has been expressed as the sodium salts given the alkaline nature of the mixture and the presence of a high sodium concentration.

EXAMPLE 11

Other deicing product compositions as manufactured by the partial solution oxidation of carbonate pulping black liquor (diluted and caustic added) and were analyzed to apparently contain (by atomic absorption and ion chromatography analysis methods) the following ranges were obtained:

| | | |
|---|---|---|
| sodium acetate | 27.3–36.0% | and generally about 31.5% |
| sodium carbonate | 23.4–35.4% | and generally about 26.0% |
| sodium formate | 11.2–24.0% | and generally about 22.5% |
| sodium "lactate" | 6.3–18.0% | and generally about 13.5% |
| by difference other compounds | (−4.6)–31.8% | and generally about 6.5% |

EXAMPLE 12

The same as in Example 11 was repeated but where the quantity of added caustic and the conditions of partial oxidation were further varied. On analysis, the following ranges were obtained:

| | | |
|---|---|---|
| sodium acetate | 24.4–51.4% | and generally about 42.1% |
| sodium carbonate | 1.2–28.8% | and generally about 4.0% |
| sodium formate | 5.5–12.4% | and generally about 12.2% |
| sodium "lactate" | 4.8–15.6% | and generally about 12.8% |
| by difference other components | 12.7–53.9% | and generally about 28.8% |

EXAMPLE 13

Deicing product compositions as manufactured by a membrane filtration process from carbonate pulping black liquor were analyzed to apparently contain (by atomic absorption and ion chromatography methods) was as follows:

| | |
|---|---|
| sodium acetate | 46.3–58.4% |
| sodium "lactate" | 4.2–7.2% |
| sodium formate | 10.1–17.1% |
| sodium oxalate | 1.9–2.7% |
| sodium sulfate | 0.2–0.3% |
| sodium chloride | less than 0.5% |
| by difference other components including sodium carbonate | 37.1–14.1% |

EXAMPLE 14

The same as in Example 13 was repeated but from liquor produced by a kraft pulping process black liquor to yield upon analysis:

| | |
|---|---|
| sodium acetate | 12.8–14.8% |
| sodium "lactate" | 8.9–10.4% |
| sodium formate | 7.8–14.8% |
| sodium oxalate | 0.4–0.6% |
| sodium sulfate | 6.1–6.9% |
| sodium chloride | 0.6–0.7% |
| sodium thiosulfate | 7.0–7.9% |
| by difference other components including sodium carbonate | 56.3–43.9% |

EXAMPLE 5

Deicing products as manufactured from a carbonate pulping process black liquor by the use of a membrane filtration process with subsequent concentration of the resultant low molecular weight permeate fraction were analyzed. The products have shown having an apparent composition as determined by atomic absorption spectroscopy and ion chromatographic analysis methods, the following ranges of:

| | | |
|---|---|---|
| sodium acetate | 46.3–62.6% | |
| sodium carbonate | 9.0–19.9% | + others to 100% |
| sodium formate | 10.1–18.7% | |
| sodium "lactate" | 4.2–8.6% | |

EXAMPLE 16

The same as in Example 15 were repeated but from deicing products manufactured from a kraft pulping process black liquor, the following were obtained:

| | | |
|---|---|---|
| sodium acetate | 12.8–16.5% | |
| sodium carbonate | 17.7% | + others to 100% |
| sodium formate | 7.9–14.8% | |
| sodium "lactate" | 8.9%–12.3% | |
| sodium sulfate | 6.1–12.7% | |
| sodium thiosulfate | 7.0–12.3% | |

EXAMPLE 17

Deicing products as manufactured from a carbonate pulping process black liquor by use of partial oxidation means to convert the high molecular weight fraction of said liquor into low molecular weight components with subsequent concentration of the low molecular weight product were shown having an apparent composition as determined by atomic absorption spectroscopy and ion chromatographic analysis methods within the ranges of:

| | | |
|---|---|---|
| sodium acetate | 24.4–60.5% | |
| sodium carbonate | 1.2–35.4% | + others to 100% |
| sodium formate | 5.5–24.0% | |
| sodium "lactate" | 4.8%–15.6% | |

EXAMPLE 18

Deicing products manufactured as in Example 17 were subjected to analysis by the use of high pressure liquid chromatographic methods. The analysis revealed a complex mixture of many components. Those identified include sodium salts of the organic acids acetic, formic, lactic, oxalic, propionic, citric, glycolic, fumaric, and others plus sodium carbonate or bicarbonate and other species such as fructose and lignin derivable organic chemicals some of whom are likely to be aromatic in nature.

Having described the invention, modifications will be evident to those skilled in the art without departing from the spirit of the invention as defined in the appended claims.

I claim:

1. A deicing product as obtained by:
   (a) using a black liquor having a pH of at least 6.5 and containing lignin, lignin degradation products and including lignin cellulose fragments and hemicelluloses, acids of the group consisting of acetate, carbonate, formate, pseudolactate, and having at least one cation selected from the group consisting of sodium, potassium, magnesium and calcium, as obtained from a pulp mill operation using a pulping process,
   (b) fractionating said black liquor from step (a) into a low molecular weight fraction wherein the compounds present in said fraction have molecular weight of less than 500 and wherein said fraction comprises based upon the total weight of solid in said fraction, between 12% and 75% acetate salts, trace amounts and 36% carbonate salts, 1 and 24% formate salts, 1 and 32% pseudolactate salts and wherein the cation of said salts is at least one member selected from the group consisting of: sodium, potassium, magnesium and calcium, and wherein said fraction further comprises lignin fractions having molecular weights of less than 500 and sugars having molecular weight of about 150 to 180, and the weight of said sugars and said lignin are less than 25% based upon said total weight of salts, said step (b) thereby maximizing the production of said salts,
   said fractionating in step (b) being selected from one of the group of methods consisting of:
   (i) control of partial wet oxidation of the black liquor under pressure and at a temperature between 140° and 230° C. to breakdown the high molecular weight fraction containing lignin, lignin degradation products and including lignin cellulose fragments and hemicelluloses, into low molecular weight fractions consisting of compounds having molecular weight of less than 500, and simultaneously during said control of partial wet oxidation, to favourably increase said salts, said control being obtained by the oxidation period, the temperature and pressure, and the amount and nature of the oxidation source, and
   (ii) direct membrane filtration to obtain the low molecular weight fraction wherein the compounds present have a molecular weight of less than 500 collected as the permeate, and said permeate as a whole constitutes said deicer, and wherein prior to said membrane filtration, said black liquor is filtered to remove large suspended particles and part of the high molecular weight fractions,
   (c) concentrating said low molecular weight fraction as obtained from step (b) to produce a concentrated deicing product,
   said product having between 20% and 100% total solid concentration, wherein the compounds present have a molecular weight of less than 500 and wherein said fraction comprises based upon the total weight of solid in said fraction, between 12% and 75% acetate salts, trace amounts and 36% carbonate salts, 1 and 24% formate salts, 1 and 32% pseudolactate salts and wherein the cation of said salts is at least one member selected from the group consisting of: sodium, potassium, magnesium and calcium, and wherein said fraction further comprises lignin fractions having molecular weights of less than 500 and sugars having molecular weight of about 150 to 180, and the weight of said sugars and said lignin are less than 25% based upon said total weight of solids.

2. A deicing product as defined in claim 1 which further includes sulfur members selected from the group consisting of sodium sulfate, sodium thiosulfate, sulfonated lignin fractions having molecular weight of less than 500, thiols and sulfides.

3. A deicing product as defined in claim 1 which is substantially free of corrosion accelerating anions.

4. A deicing product as defined in claim 1 which includes salts of oxy and hydroxy acid, and which is substantially free of corrosion accelerating anions.

5. The deicing product as defined in claim 1 wherein said mixture comprises at least 90% by weight of a mixture of sodium acetate, sodium carbonate, sodium formate, and sodium lactate, and less than 0.5% sodium chloride, based upon the total weight of the solid present in the deicing product.

* * * * *